United States Patent [19]

Baldwin

[11] Patent Number: 5,161,843
[45] Date of Patent: Nov. 10, 1992

[54] MULTIPURPOSE HAULING DEVICE

[75] Inventor: Robert Baldwin, Howardsville, Va.

[73] Assignee: Mt. Alto Outdoor Products, Gerrardsville, Va.

[21] Appl. No.: 574,309

[22] Filed: Aug. 28, 1990

[51] Int. Cl.⁵ .................... A01M 31/00; B65G 7/12
[52] U.S. Cl. ................................. 294/26; 294/16
[58] Field of Search ................ 294/26, 15, 16, 97, 294/118, 141, 142, 169, 170; 452/185, 187, 189, 190

[56] References Cited

U.S. PATENT DOCUMENTS

| | | | |
|---|---|---|---|
| 361,108 | 4/1887 | Wright | 294/118 |
| 824,822 | 7/1906 | Samuelson | 294/97 X |
| 1,740,383 | 12/1929 | Wessel | 294/118 X |
| 2,156,735 | 5/1939 | Packer | 294/118 X |
| 2,436,053 | 2/1948 | Mundahl | 294/118 |
| 4,023,844 | 5/1977 | Roberts | 294/26 |
| 4,243,164 | 1/1981 | Burlison et al. | 224/52 |
| 4,431,121 | 2/1984 | Bensette et al. | 224/153 |

FOREIGN PATENT DOCUMENTS

6442 8/1879 Fed. Rep. of Germany ...... 452/189

Primary Examiner—Johnny D. Cherry
Assistant Examiner—Dean J. Kramer

[57] ABSTRACT

A game dragging device is provided which includes a first, handle member and a first game grabbing member. The handle member has a pair of leg members and a first hole proximate the distal end of one of its legs. It also has at least a second hole which is located substantially at the mid point of the leg. A first, hook member, is provided which has a barb-like member at one end and a hole proximate its other end. A first rotation member rotatably secures the handle member to the hook member to form a first unit. A second unit is provided which is essentially identical to the first unit. The first and second units are rotatably secured to each other such that the first unit being positioned so as to be reversed relative to said second unit. The handle member and the first hook member are secured to each other to form a unit which is essentially in the form of an S-shaped member.

4 Claims, 11 Drawing Sheets

MULTIPURPOSE HAULING DEVICE

BACKGROUND OF THE INVENTION

1. Field of the Invention

The invention is related to a device which has a plurality of uses, including carrying or dragging objects, such as game, logs, or the like, and hanging game from a tree branch. Brief description of the prior art Hunting is popular is rural areas where game reside, not only for sport but for food. Heretofore, the hunting "industry" has provided hunters with many articles to make their hunting time more successful and comfortable. One problem which has not yet been solved is the removal of the carcass from the woods; it is obviously difficult for one or two men to move a large deer, elk or moose over rough terrain. Most hunting animals reside in protective areas, woods, rocks or mountains. Several devices have been patented which attempt to overcome the difficulties of terrain, weight and distance while staying simple, economical, compact and effective, however, none have been totally successful. The instant disclosure overcomes the above difficulties with an easy to use, economical device.

2. Description of the Prior Art

In U.S. Pat. No. 4,243,164, Burlison et al discloses a game dragging device which has a rigid hand bar with a pair of adjustable, spaced clamp loops. The loops are secured to the front feet of the animal and a third loop is secured to the animal's head to keep the head clear of the ground. A longer, two man version is also disclosed. However, the device employs a rigid bar and thus cannot accommodate use by persons of different heights or use on uneven terrain. Further, the Burlison et al device has several parts which have the potential of becoming lost in the woods a well as being a cumbersome and time consuming unit to use.

SUMMARY OF THE INVENTION

A game dragging device is provided which includes a first, handle member and a first game grabbing member. The handle member has a pair of leg members and a first hole proximate the distal end of one of its legs. It also has at least a second hole which is located substantially at the mid point of the leg. A first, hook member, is provided which has a barb-like member at one end and a hole proximate its other end. A first rotation means rotatably secures the handle member to the hook member to form a first unit. A second unit is provided which is essentially identical to the first unit. The first and second units are rotatably secured to each other such that the first unit being positioned so as to be reversed relative to said second unit. The handle member and the first hook member are secured to each other to form a unit which is essentially in the form of an S-shaped member.

In the preferred embodiment, the handle member is rotatably secured to the hook member such that when the two units are rotatably secured together, a barb-like member of the first hook member is position away from the barb-like member of the second hook member.

BRIEF DESCRIPTION OF THE DRAWINGS

The objects and advantages of the instant invention will become apparent when the specification is read in conjunction with the drawings, wherein.

DESCRIPTION OF THE INVENTION

Figure 1:
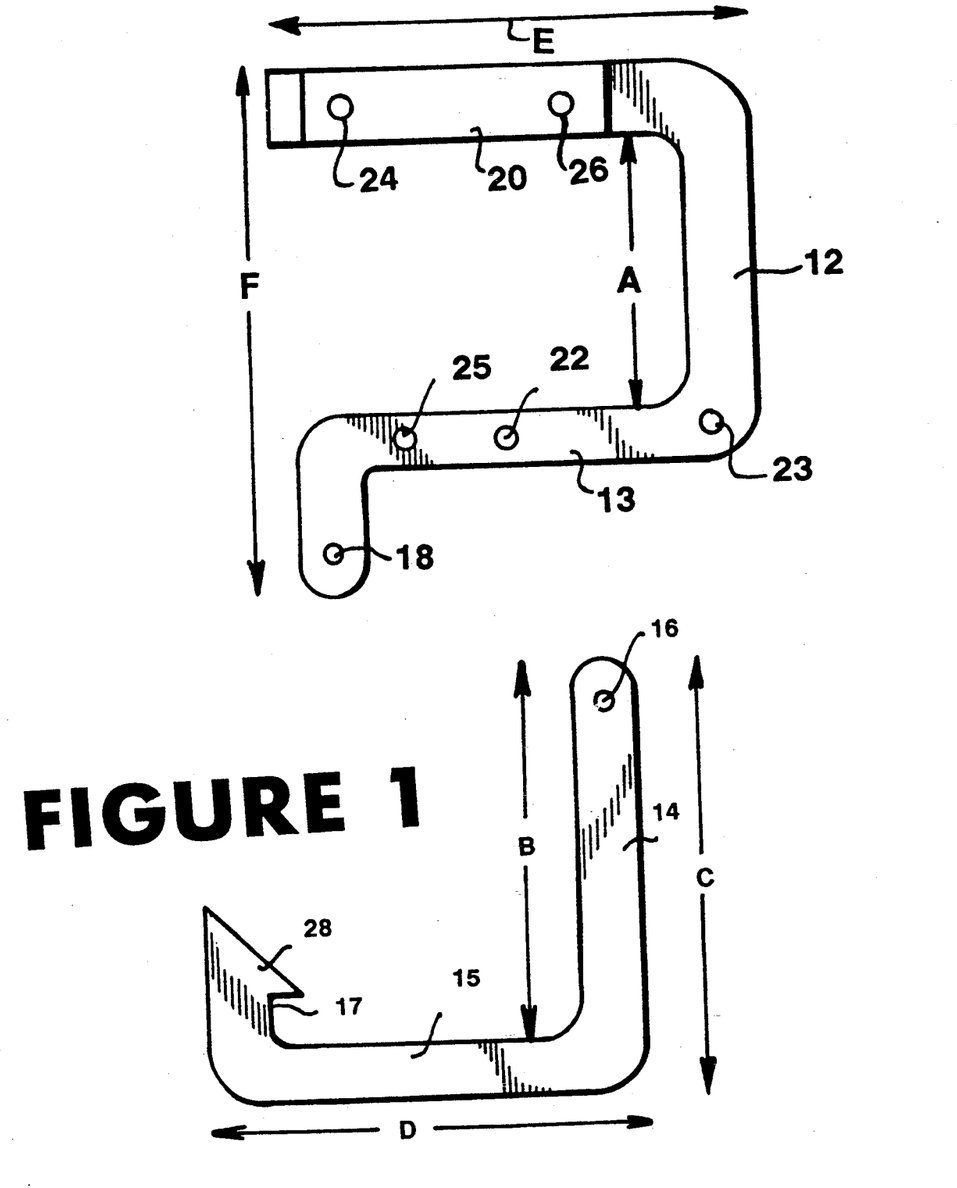
FIG. 1 is a front view of the front half unit of an embodiment of the instant disclosure, with the unit shown in unassembled form.

FIG. 1 illustrates the front half of the four piece multipurpose hauling device shown in its unassembled state. The top frame 12 and bottom frame 14 are manufactured from any strong, light weight material, such as aluminum or any number of materials in the plastic family. A combination of aluminum dipped into plastic can also be utilized, however whatever the material, the strength and weight criteria must be met. Graphite reinforced plastics provide weight advantages, but typically are very expensive.

The bolt holes 16 and 18 are used to connect the top frame 12 and the bottom frame 14 through use of standard bolts, rivets or screws. The optimum size for the hole would be ¼ inch, however, the size could be increased or decreased slightly, although not to the extend where it would affect the structural integrity of the item. The bolt strength must be sufficient to accommodate the weight load of hauling large animals, with a minimum haul weight of 300 pounds. The bolt holes 16 and 18 are drilled or punched into the ends of the top frame 12 and bottom frame 14 at a centered position proximate the ends of the top frame 12 and bottom frame 14. Any convenient means can be used for the securing device of the top frame 12 to the bottom frame 14. Rivets have the advantage of durability while screws and bolt have a tendency to work loose. Further, rivets can provide reliable spacing and can provide a balance between permitting top frame 12 and bottom frame 14 to move relative to one another without permitting excessive play.

Bolt holes 22, 23 and 25 are predrilled at specified positions to allow the front frame 40 to be secured to its mirror image counterpart. The advantages achieved by these alternate positions are described further herein.

For use within this disclosure, reference will be made to use of a bolt securing the two items together, but it should be understood that the term is not intended to exclude other means of securing the elements. Although the securing device is not narrowly critical, the criteria which must be met by the securing device is critical. The diameter of the securing device must be sized slightly smaller than the diameter of the bolt holes 16 and 18 to allow for easy closure of the device while preventing side to side movement. Such side to side movement, that is, the relative twisting of top frame 12 and bottom frame 14, can interfere with the free movement of the two parts and can contribute to the failure of the bolt which holds the two parts together.

The optimum sizing for all embodiments is provided hereinafter, and should be considered examples and should not, in any way, limit the scope of the invention. The preferred total width E of the top frame 12 is approximately 6 inches and the height F approximately 6 inches. These distances, as well as others indicated herein, are indications of preferred dimensions and should only be considered as indications of the proportions and sizing. The distance A between the two legs of the top frame 12 must be less than the distance B, which is the distance from the base of the bottom frame 14 to the base 15 of the leg of the bottom frame 14. If the distance B is less than the distance A, when the bottom frame 14 is swung around up and into the folding position it will be unable to completely close due to the handle 20. The distance B must be at least equal to distance A plus the height of the handle 20 but not so great as to compromise the strength and rigidity of the material of manufacture.

A plurality of holes can be provided to enable the user to select a configuration best suited to the circumstances which have been encountered.

The handle 20 is affixed to the top portion of the frame 12 through use of rivets 24 and 26. Rivets provide an easy means of attachment, however other methods could be used depending upon the materials used and ease of manufacture.

The gripping angle 28 has, in the preferred embodiment, rounded ends for hunter safety. A knife can be used to cut the skin behind the leg of the animal to insert the gripping angle 28. The leg 17, between the gripping angle 28 and the base 15, is, in its preferred embodiment, approximately one and one half inches to two inches. Although the leg 17 can vary in length from the preferred measurements, this length is the optimum to ensure that the animal being dragged does not fall off.

The exact dimensions of the carrying unit are not critical, however, the proportions of the element are critical for the multipurpose hauling device to be effective. The preferred total width D, the outside dimension of the base of the bottom frame 14 is approximately 6 inches and the height C, of the leg of the bottom frame 14 approximately 5 inches.

Figure 4:
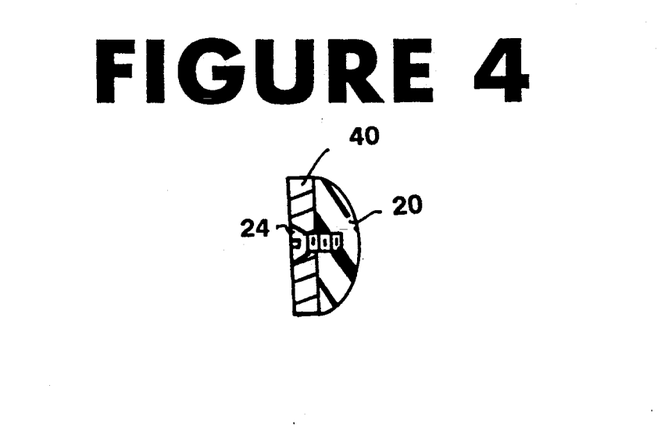
FIG. 4 is an end view of the handle section of the embodiment of FIG. 3.
Figure 11:
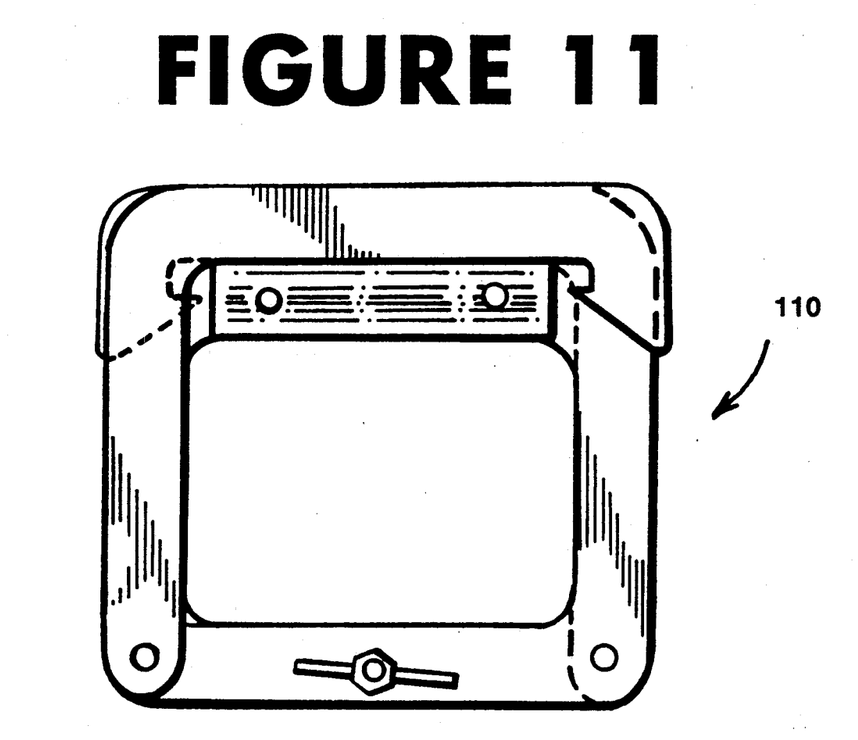
FIG. 11 is a front view of the device of FIG. 6.

The distance from the pivot hole 16 to the base 15 of the bottom frame 14 should be greater than the distance from the pivot hole 18 of the top frame 12, to achieve a compact closing of the device when the top frame 12 is provide with handle unit, such as the semicircular handle illustrated in FIG. 4. The longer dimensions on the bottom frame 14 allows the base 15 to swing swing above the handle 20, as illustrated in FIG. 11. In those instance where no raised handle is provided, it is preferable for the base portion 15, of the bottom frame 14 to overly the handle region of the top frame member 12, when the device is in the closed position. Thus, in the embodiment of FIG. 1, when the dimension C of the bottom frame is equal to the dimension F of the top frame, the unit can be closed to form a simple compact unit.

Figure 2:
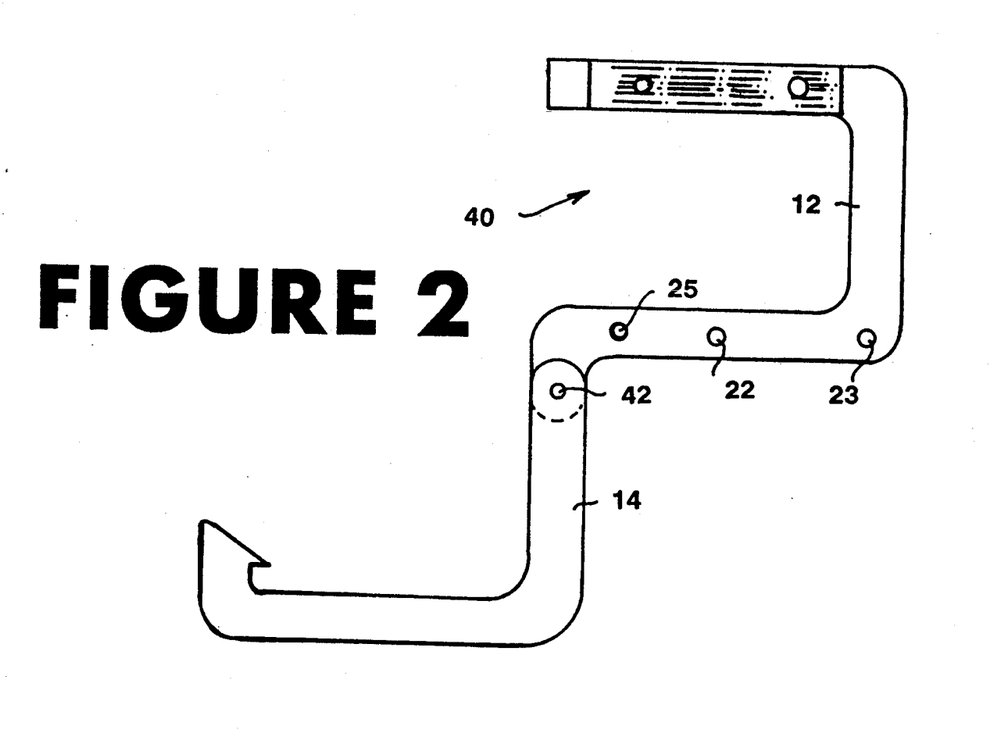
FIG. 2 is a front view of the front half unit of FIG. 1, showing the unit in assembled form.

The assembled front half of the multipurpose hauling device 40 is shown in FIG. 2. The top frame 12 has been secured to the bottom frame 14 through use of bolt 42. It should be noted that in order for the carrying unit 40 to close, as illustrated in FIG. 11 herein, the bottom frame 14 must be placed on the outside of the top frame 12. If the positions are reversed, the multipurpose hauling device will be unable to close as the bottom frame 14 would have to fit between the front half of the device and back half of the device.

When used by two people, the front half of the multipurpose hauling device 40 can be used to secure one leg of the animal while the mirror image back half of the carrying unit can secure the other leg. This provides an advantage over standard units in that two people of substantially different heights can both drag an animal comfortably since the units are totally separate in this embodiment. The shorter of the two people can walk one or more paces ahead of the taller person, thereby evening out the weight load. When the multipurpose hauling device is used by a person, or persons, of approximately six foot, approximately 40% of the animal's weight is off the ground due to the drag angle, thereby greatly reducing the degree of drag resistance.

Figure 3:
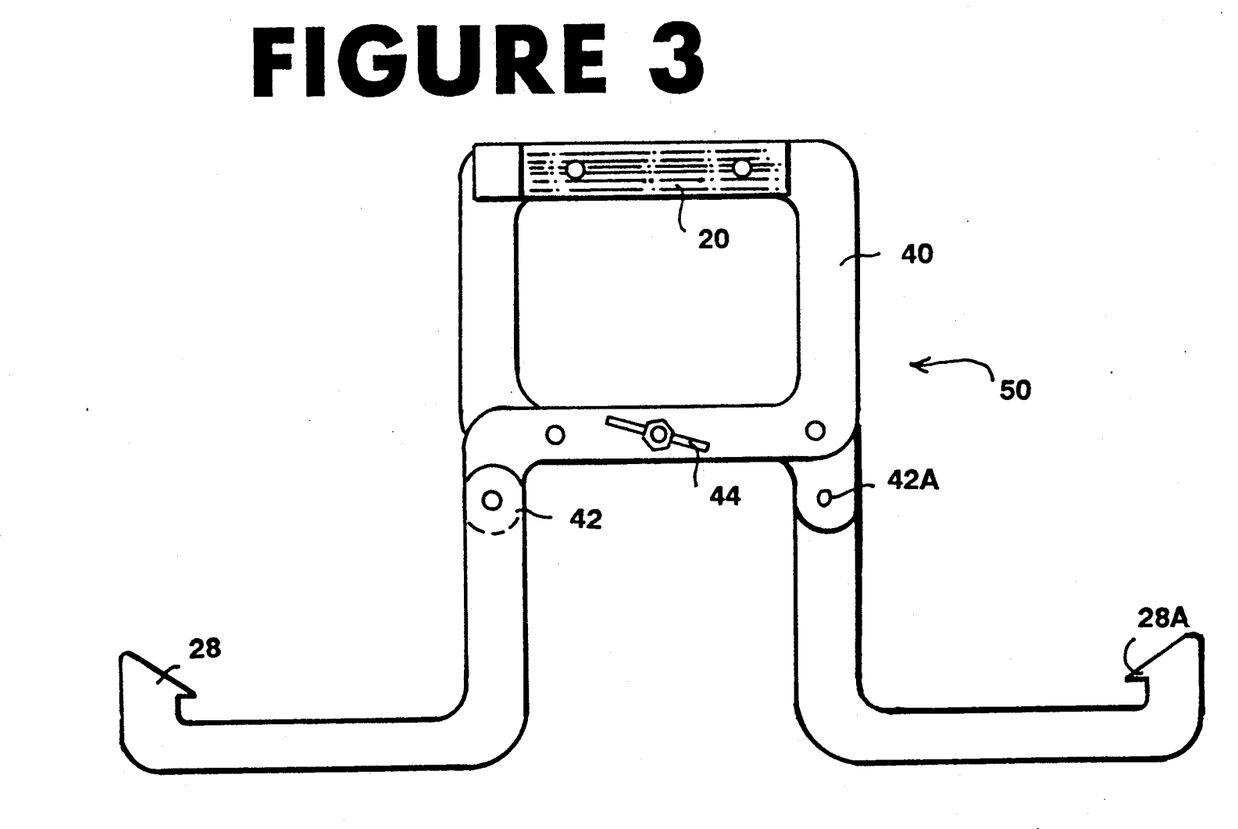
FIG. 3 is a front view of the assembled embodiment of FIG. 2, in combination with a second unit which is a duplicate of the first unit and in a reverse overlap position to form a complete device.

The front half and the back half of the multipurpose hauling device are mirror images to on another. In FIG. 3 the front frame 40 of the carrier unit 50 has been secured to its mirror image counterpart to form carrier unit 50. The two units are secured by aligning the bolt hole 22 of assembled front half 40 with the counterpart bolt hole of the assembled back half of the device and placing a post and screw through to secure the two devices. Post and screw fixtures are common in the prior art and are available from Stimpson of Bayport, N.Y. Although other means can be used to secure the device, such as a wing nut or bolt, the post and screw are the preferred securing means. The post and screw provide an economical means for securing with a predictable head size. The consistency in the head size assures easy fit into a carrying case and smooth edges. The predetermined, unalterable shaft size also prevents the possibility of the user tightening the securing means too much to prevent easy closing or too little and having the securing device fall out. The user tightens the post and screw as tightly as possible without worry of the front half and back half of the device binding together.

The handle 20 of the top frame 12 can be a semicircular plastic element molded to conform to one side of the top frame 12, as illustrated in FIG. 4. The two handle elements 20, in combination, allow for ease of grip while still allowing the assembled front frame and assembled back frame to be flush with each other. The handle 20 can be manufactured from any material, in any color, suitable for carrying handles, although fluorescent orange or red plastic or rubber handles are preferred. The fluorescent colors provide an additional measure of safety as well as allowing the device to be easily located if dropped. Plastic and rubber have long been used as handles for various items due to their durability and ease of manufacture. The handle 20 can be secured to the top frame 12 in any manner convenient for manufacture, such as through use of screws 24 and 26 or rivets.

A smooth outer surface is preferred to avoid a rough surface from coming in contact with the users skin. A flat inner surface is required in order for the top frame 12 and its mirror counterpart to lie flush against one another. The handle 20 shown in FIG. 4 is an example of the possible configuration, however one or more grooves can be added to the handle for comfort and to prevent roll over. Although the handle is optional, especially when used by one person, it does provide comfort for the user, especially when used with two people.

Figure 5:
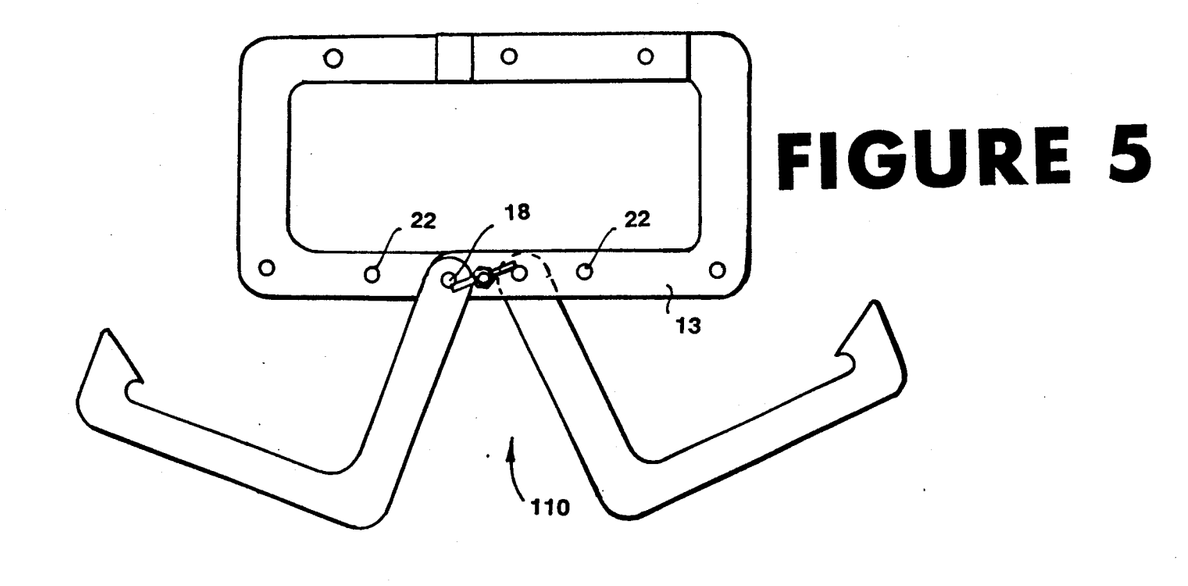
FIG. 5 is a front view of another embodiment of the instant invention, shown with its two unit in a slightly overlapped position.

It should be noted that the position of the bolt hole 22 in the leg 13 of U-shaped top frame 12 controls the relative positioning of the final assembly. Generally, the hole is centrally positioned in the leg 13 of the top frame member 12 providing the configuration of FIG. 3. Alternatively, the front half and back half can be connected at hole 25, thereby offset in the direction of the distal end of the leg 13, that is, offset towards the hole 18. This modification serves to produce a unit in which the hand grip region is enlarged, as illustrated in FIG. 5, thus accommodating two hands. This arrangement also serves to decrease the spacing between the two J-hook shaped bottom frames 14.

Figure 6:
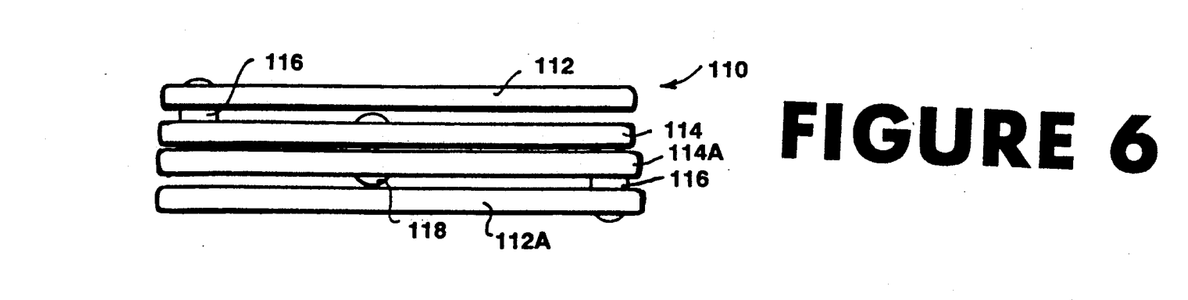
FIG. 6 is an side view of the device of FIG. 5, shown in a completely closed position.

In FIG. 6 and FIG. 11, the game dragging device 110, is shown in the folded position. The criticality of the distance B and the distance A proportions becomes readily apparently when viewing FIG. 11. The bottom frame 114 is pivoted at the bolt 144, bringing the bottom frame 114 to rest along side the top frame 140. The compactness of the width of the unit is illustrated in FIG. 6. In order for the bottom frames 112 and 112a to swing easily around the top frames 114 and 114a, spacers 116 and 116a have been added. The spacers prevent the metal from binding and allow room for the post and screw 118. The carrying unit 110, in this position, is quite portable and easy to store in a backpack, etc. The unit can be readily accommodated in a simple, shallow carrying case and thus is highly suited for use by hunters.

Figure 7:
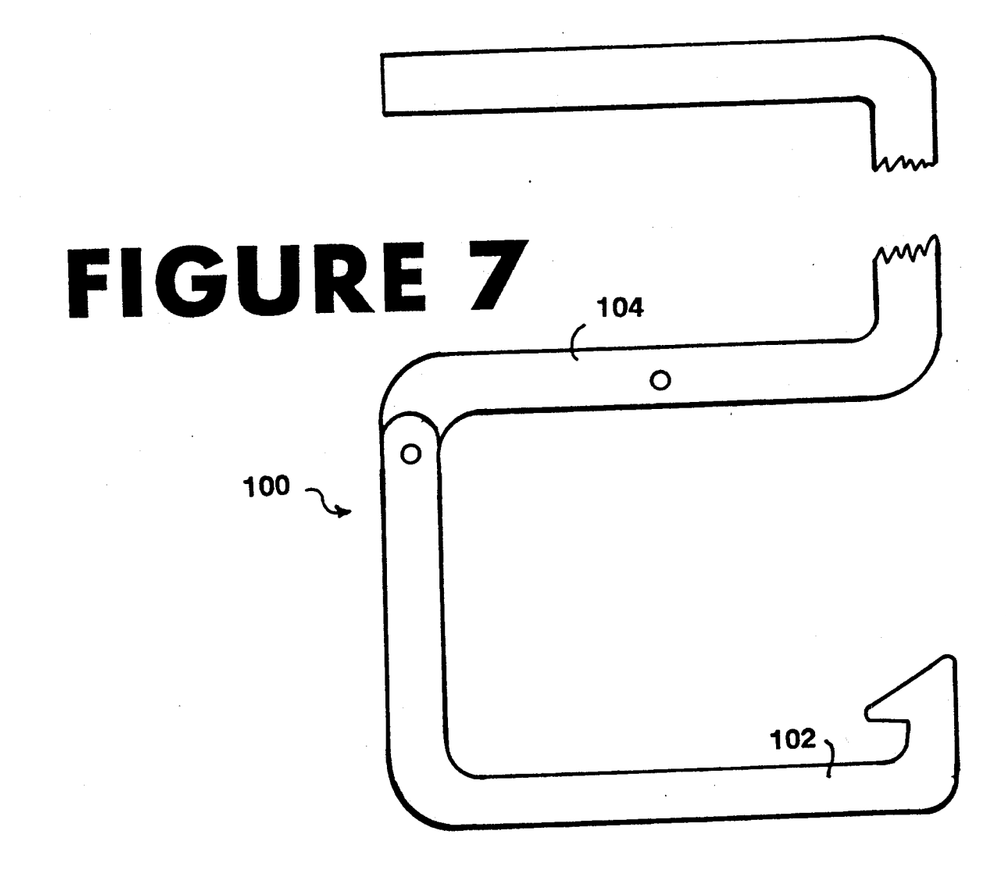
FIG. 7 is a side view of one half of the unit of FIG. 2, shown assembled to form an alternate embodiment of the instant invention.
Figure 8:
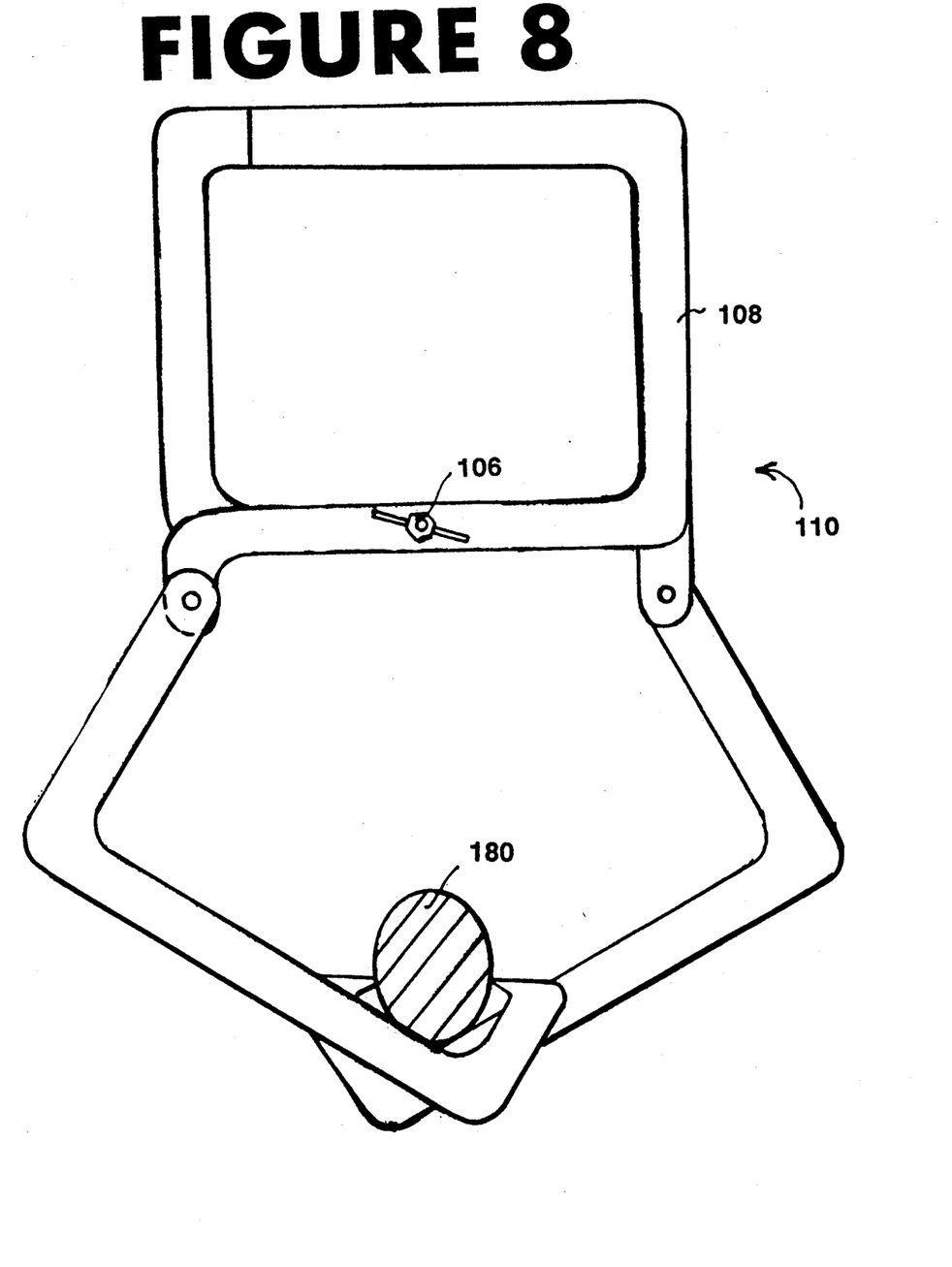
FIG. 8 is a front view of the assembled alternate embodiment of FIG. 7, shown in use to carry an object.

FIG. 7 illustrates an alternate embodiment of the instant disclosure. The bottom frame 102 of the front half of the carrying unit 100 is reversed, in relation to top frame 108, from that of the prior embodiment. The carrying unit 100 forms a "S" shape which, when combined with the mirror image bottom half forms the carrying unit 110 a illustrated in FIG. 8. The the bolt 106 can be left loose initially to allow the carrying unit 110 to be used with a scissors action to grab an item, such as a log 180. The carrying unit can then be returned to the position as illustrated in FIG. 8 and the bolt 106 tightened.

Figure 9:
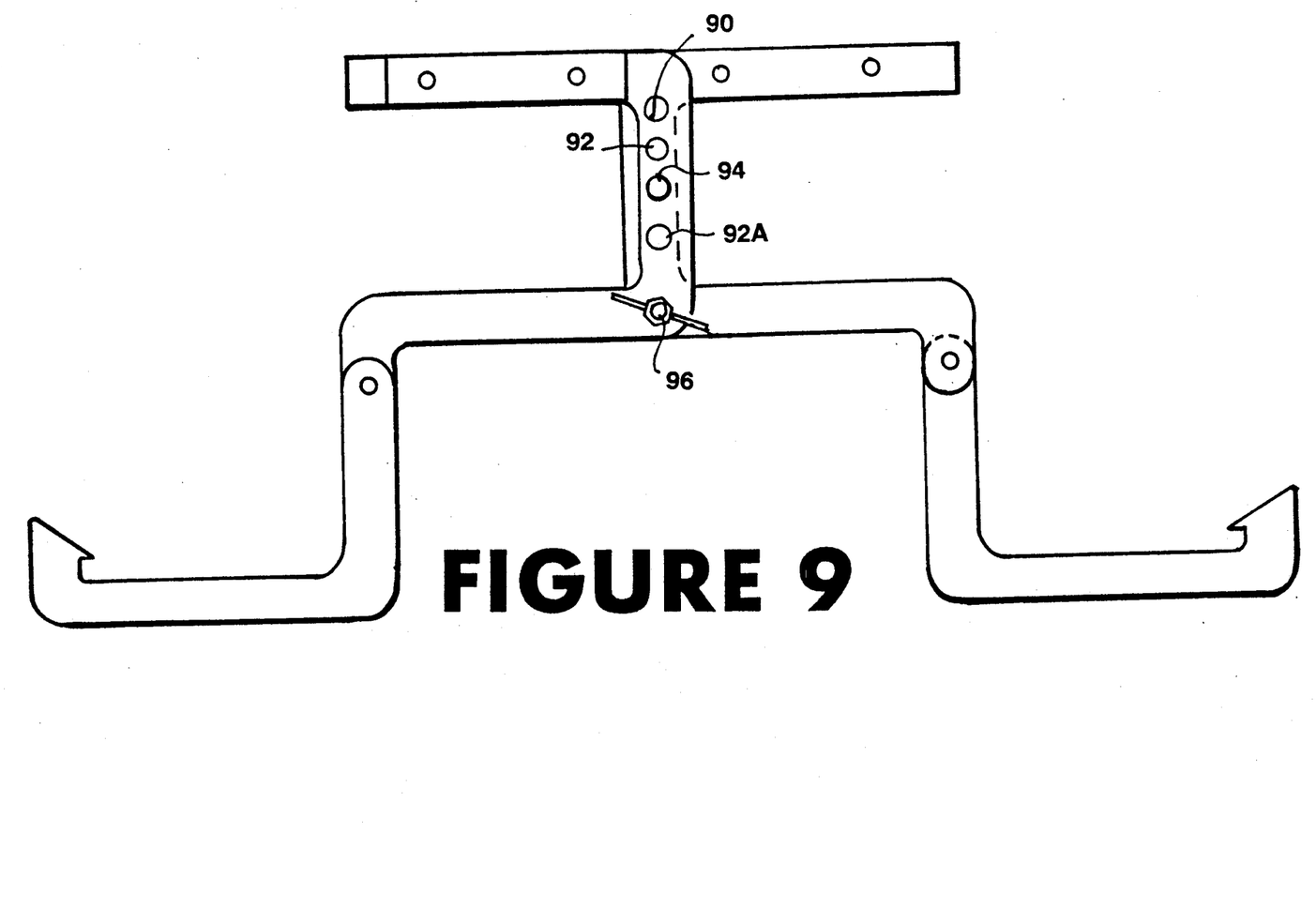
FIG. 9 is a side view of one half of the unit of FIG. 3, shown assembled in a varied overlapped position to form an alternate embodiment of the instant invention.

Alternatively to the foregoing, the device can be secured at holes 22 which are offset toward the base of the U. This provides an embodiment in which the distance between the base portions of the two overlying top frame members is decreased and the distance between the two J hook shaped bottom frame members is increased. In this latter embodiment, as illustrated in FIG. 9, two separate hand grip regions are provided and the J hook shaped members are widely spaced apart. This embodiment is particularly suited to accommodate simultaneous use by two people. If desired, a single or pair of securing devices can be provide in the handle region of the top frame members, to prevent movement of one top frame member relative to the other top frame member. If a single bolt 94 is used, it should be centered. If a pair of bolts 92 and 92a are used, there should be a one inch spacing between the safety stud 90 and the bolt 96. Movement of the J-hook members is desirable because it serves to minimize the size differences and allows for an easing of a jar created by the animal being pulled over obstacles.

Figure 10:
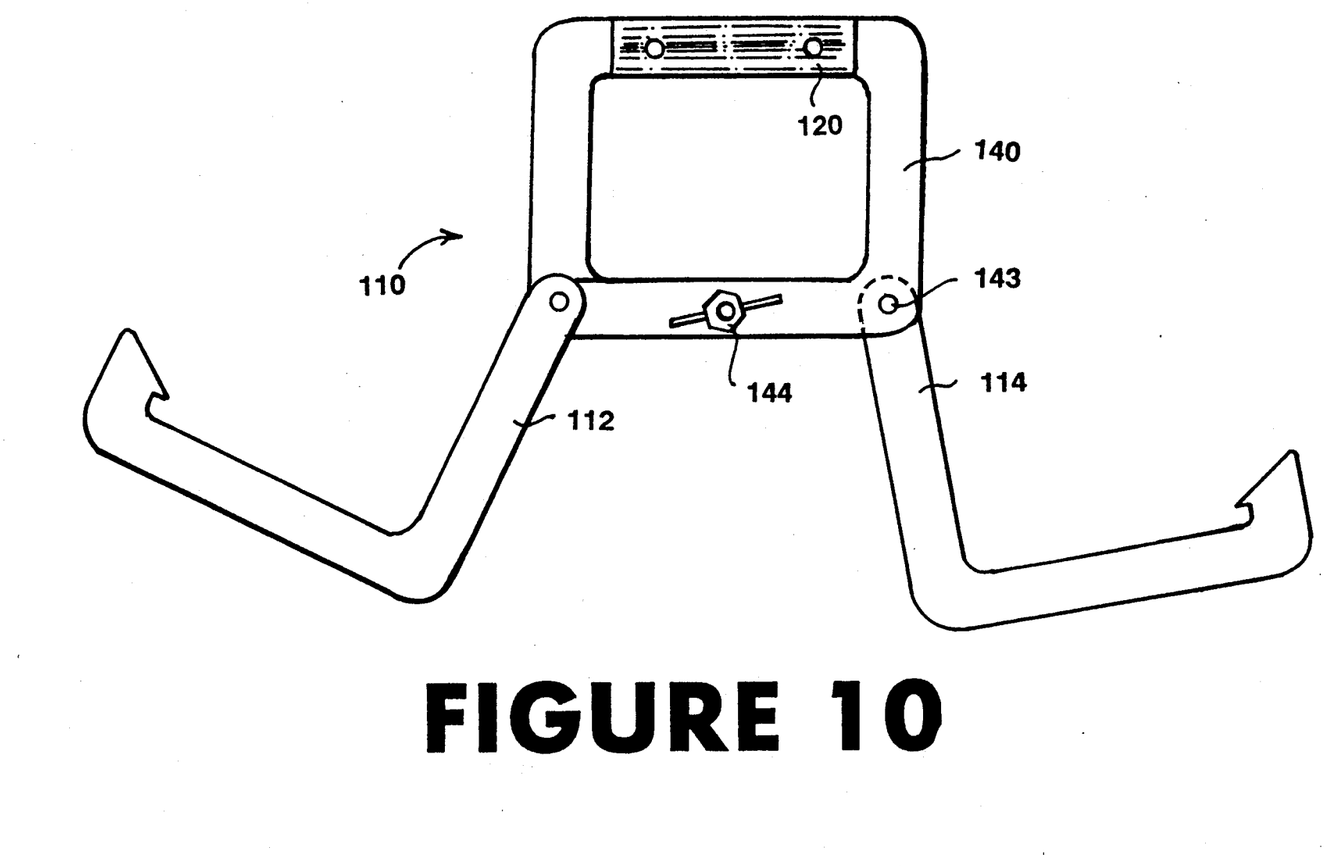
FIG. 10 is a front view of the assembled alternate embodiment shown assembled and ready for use to carry or drag an object.

The device 110 as illustrated in FIG. 10, is essentially the functional equivalent of the device 50, as illustrated in FIG. 3, except for the fact that it can be compacted closed, even when provided with a raised handle 20.

Figure 12:
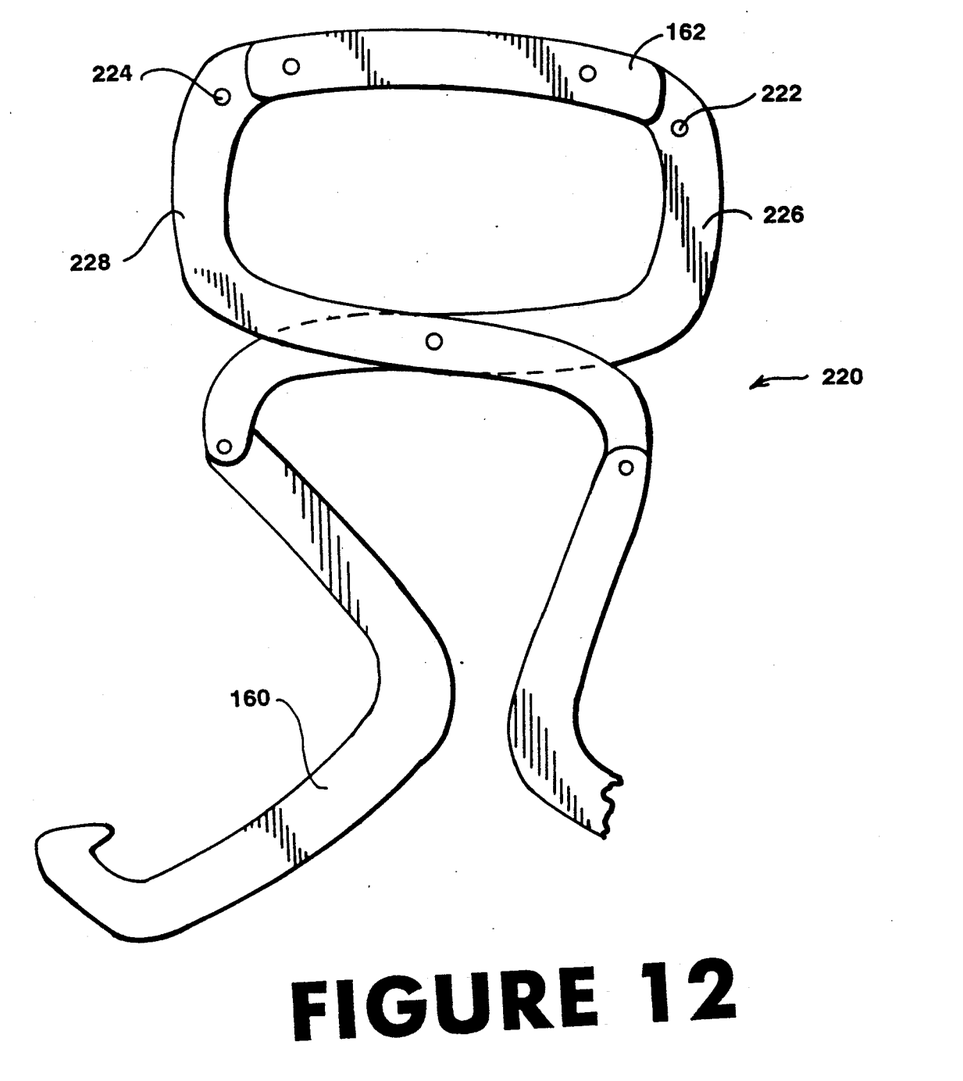
FIG. 12 is a fragmented front view of a alternate embodiment in a open position.
Figure 13:
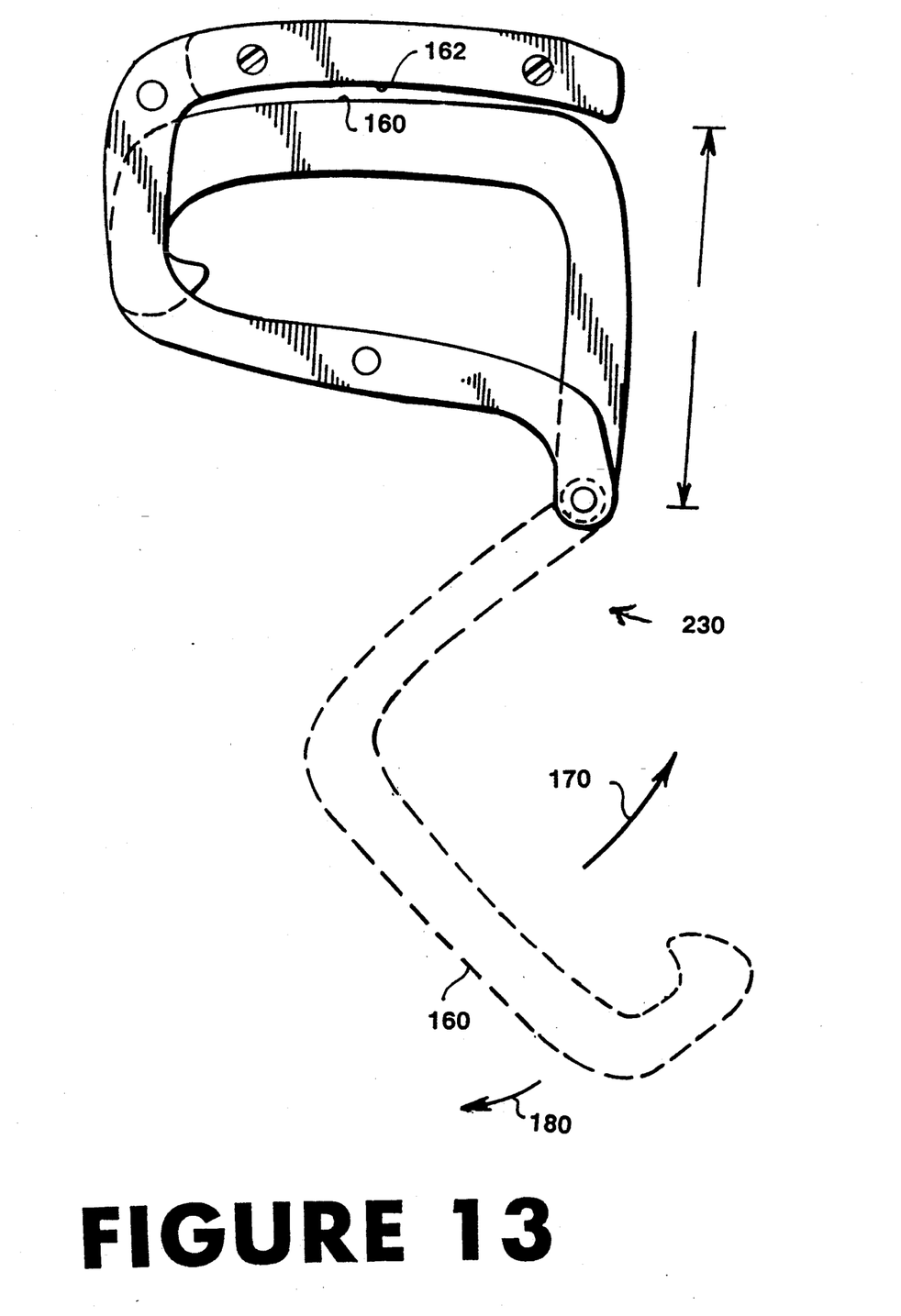
FIG. 13 is a side view of one half of the embodiment in FIG. 12, in a closed position.

In FIG. 12 an alternate embodiment of the multipurpose hauling device is illustrated wherein the device has more of a "S" curve configuration. Stop studs 224 and 222 are placed in each side of the top frames 226 and 228 to prevent the top frames 226 and 228 from rotating, thereby squeezing the user's hand. The top frames 226 and 228 rotate only to the point of contact with the stop studs 226 and 228. The bottom frame 160 is dimensioned to rotate in the direction of arrow 170, as shown in FIG. 13, to lodge parallel with and beneath the handle 162. In order to open the multipurpose hauling device 230, the bottom frame 160 is swung in the direction of arrow 180.

What is claimed is:

1. A multipurpose hauling device comprising:
   (a) a first, essentially U-shaped member, said U-shaped member having a first hole proximate the distal nd of the first leg of said U-shaped member and a second hole substantially at the mid point of said first leg, wherein the second leg of said first, essentially U-shaped member forms a handle member;
   (b) a first, essentially J-shaped member, said J-shaped member having a barb-like member at one end and a hole proximate the other end of said J-shaped member,
   (c) first rotation means, said rotation means rotatably securing said J-shaped member to said U-shaped member to form a first unit,
   (d) a second, essentially U-shaped member, said U-shaped member having a first hole proximate the distal end of one leg of said U-shaped member and a second hole substantially at the mid point of said one leg, wherein the second leg of said second, essentially U-shaped member forms a handle member;
   (e) a second, essentially J-shaped member, said second J-shaped member having a barb-like member at one end and a hole proximate the other end of said J-shaped member,
   (f) second rotation means, said rotation means rotatably securing said second J-shaped member to said second U-shaped member to form a second unit,
   (g) third rotation means, said third rotation means rotatably securing said first unit to said second unit, wherein each of said handle members includes a substantially semicircular elongate handle unit, which when said handle members are rotated to a position in which the handle members form a substantially closed loop, form a substantially rod shaped carrying handle.

2. A multipurpose hauling device comprising:
   (a) a first essentially U-shaped member, said U-shaped member having a first hole proximate the distal end of the first leg of said U-shaped member and a second hole substantially at the mid point of said first leg, wherein the second leg of said first, essentially U-shaped member forms a handle member;
   (b) a first, essentially J-shaped member, said J-shaped member having a barb-like member at one end and a hole proximate the other end of said J-shaped member,
(c) first rotation means, said rotation means rotatably securing said J-shaped member to said U-shaped member to form a first unit,
(d) a second, essentially U-shaped member, said U-shaped member having a first hole proximate the distal end of one leg of said U-shaped member and a second hole substantially at the mid point of said on leg, wherein the second leg of said second, essentially U-shaped member forms a handle member;
(e) a second, essentially J-shaped member, said second J-shaped member having a barb-like member at one end and a hole proximate the other end of said J-shaped member,
(f) second rotation means, said rotation means rotatably securing said second J-shaped member to said second U-shaped member to form a second unit,
(g) third rotation means, said third rotation means rotatably securing said first unit to said second unit wherein each of said U-shaped members further comprise handle means, said handle means comprising a semi-cylindrical member, such that the two handle means in combination, form an essentially cylindrical handle unit, and wherein said J-shaped members are rotatable to a position in which they are positioned proximate said handle means, and one the side of said handle means which is toward said third rotation means.

3. The device of claim 2, further comprising spacer means, said spacer means being positioned between each said J-shaped member and the associated U-shaped member, whereby said J-shaped members are enabled to clear said third rotation means when being rotated about first and said second rotation means.

4. The device of claim 2, wherein said handle means includes a plurality of longitudinal grooves, said longitudinal grooves serving to decrease slippage between the hand of the user and the handle during use.

* * * * *